US012646095B2

(12) United States Patent
Schultz

(10) Patent No.: US 12,646,095 B2
(45) Date of Patent: Jun. 2, 2026

(54) DIGITAL ASSET AGREEMENT GENERATION AND VERIFICATION SYSTEM

(71) Applicant: Affinitrix, LLC, Plymouth, MN (US)

(72) Inventor: William Daniel Schultz, Plymouth, MN (US)

(73) Assignee: Affinitrix, LLC, Plymouth, MN (US)

( * ) Notice: Subject to any disclaimer, the term of this patent is extended or adjusted under 35 U.S.C. 154(b) by 211 days.

(21) Appl. No.: 18/316,791

(22) Filed: May 12, 2023

(65) Prior Publication Data

US 2023/0368157 A1      Nov. 16, 2023

Related U.S. Application Data

(60) Provisional application No. 63/341,350, filed on May 12, 2022.

(51) Int. Cl.
| | |
|---|---|
| *H04L 9/00* | (2022.01) |
| *G06F 40/55* | (2020.01) |
| *G06Q 30/06* | (2023.01) |
| *G06Q 50/18* | (2012.01) |

(52) U.S. Cl.
CPC ............. G06Q 30/06 (2013.01); G06F 40/55 (2020.01); H04L 9/50 (2022.05); *G06Q 50/18* (2013.01); *G06Q 2220/10* (2013.01)

(58) Field of Classification Search
CPC .. G06Q 20/065; G06Q 30/06; G06Q 2220/10; H04L 9/50; H04L 67/1065
See application file for complete search history.

(56) References Cited

U.S. PATENT DOCUMENTS

| | | | | |
|---|---|---|---|---|
| 6,684,254 | B1 * | 1/2004 | Dutta .................... | G06F 16/955 |
| | | | | 707/E17.112 |
| 11,783,323 | B1 * | 10/2023 | Winklevoss ....... | G06Q 20/3829 |
| 2003/0083995 | A1 * | 5/2003 | Ramachandran ...... | G06Q 30/04 |
| | | | | 705/52 |
| 2011/0055090 | A1 * | 3/2011 | Ross .................... | G06Q 50/184 |
| | | | | 707/758 |
| 2012/0022975 | A1 * | 1/2012 | L'Heureux ........ | G06Q 30/0641 |
| | | | | 726/4 |
| 2015/0206101 | A1 * | 7/2015 | Choi .................... | G06Q 50/184 |
| | | | | 705/311 |
| 2020/0027067 | A1 * | 1/2020 | Hertzog .................... | H04L 9/50 |
| 2020/0074518 | A1 * | 3/2020 | Kumaraswamy ...... | G06Q 20/12 |
| 2021/0182423 | A1 * | 6/2021 | Padmanabhan ....... | H04L 9/3271 |
| 2021/0258155 | A1 * | 8/2021 | Andon ............... | G06Q 30/0643 |
| 2021/0342131 | A1 * | 11/2021 | Liu .......................... | G06F 21/64 |
| 2022/0215361 | A1 * | 7/2022 | Koch .................... | G06Q 20/123 |
| 2022/0391904 | A1 * | 12/2022 | Bowdon ................ | G06Q 20/10 |
| 2023/0049167 | A1 * | 2/2023 | Wilson ............. | G06V 30/19107 |

* cited by examiner

*Primary Examiner* — Wodajo Getachew

(74) *Attorney, Agent, or Firm* — Merchant & Gould P.C.

(57) ABSTRACT

In general terms, this disclosure is directed to methods and systems for generating and verifying digital asset agreements. One aspect is a method for publishing a digital asset with an agreement, the method comprising receiving a digital asset, receiving inputs selecting terms for the agreement of the digital asset, the terms being in a natural language, translating the selected terms for the digital asset into a transaction protocol written in a transaction protocol language, compiling the transaction protocol into bytecode which can be published on a blockchain, publishing the bytecode on the blockchain.

18 Claims, 13 Drawing Sheets

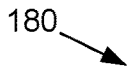
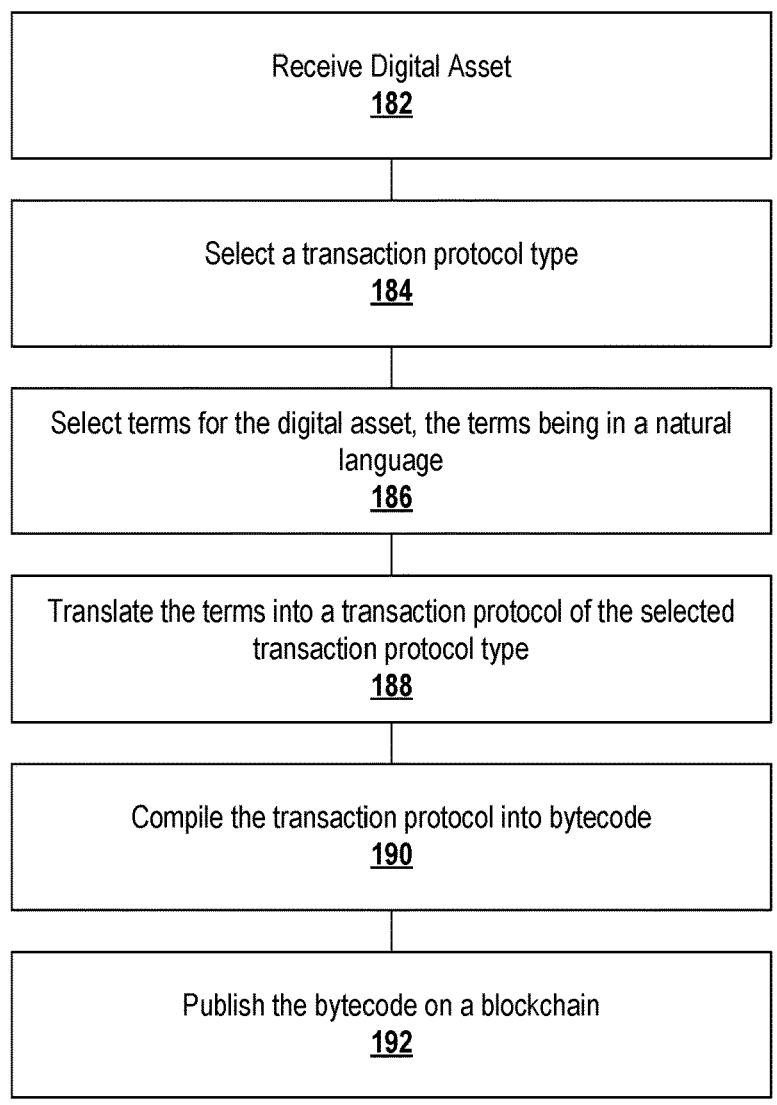
FIG. 4

210

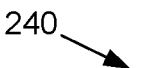
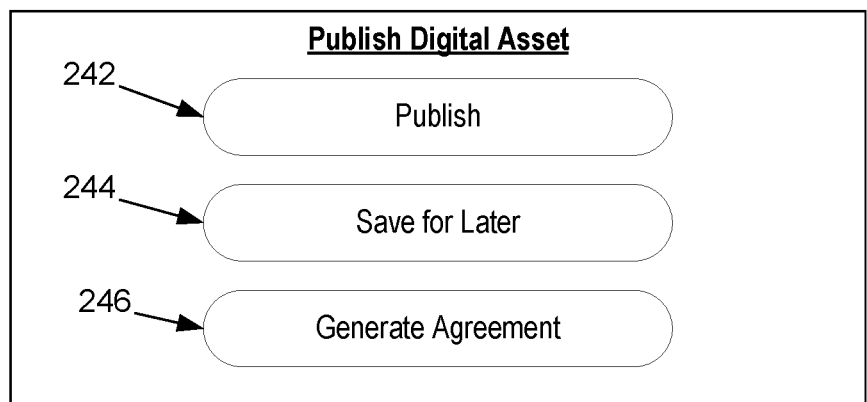
FIG. 6

Digital Asset Agreement Generator

Extracted Terms 282

| TITLE | NFT PROJECT |
|---|---|
| Description | |
| Primary Media | \<Link\> |
| Current Owner: | \<Link\> |
| Ownership Rights | 10% of each sale to Original Owner |
| Agreement Type: | Smart Contract-ERC 721 |
| Status: | Active – Not for sale |
| Storage Type: | Server – Backed Up |
| Other Terms: | Term 1, Term 2, ... Term X |

Add Customized Terms 286

Assigned? ☐

Authorized for commercial use? ☐

Authorized for non-commercial use? ☐

Authorized for use outside of the U.S.? ☐

| Additional Terms | \<Enter Term\> |
|---|---|
| | \<Enter Term\> |
| | \<Enter to add more terms\> |

Predefined Templates 284

▶ <u>Templates</u>
Standard Agreement – No Assignment of IP
Assignment of IP Agreement
Royalty on sale agreement
Standard Marketing Agreement
...

Digital Asset Preview 288

310

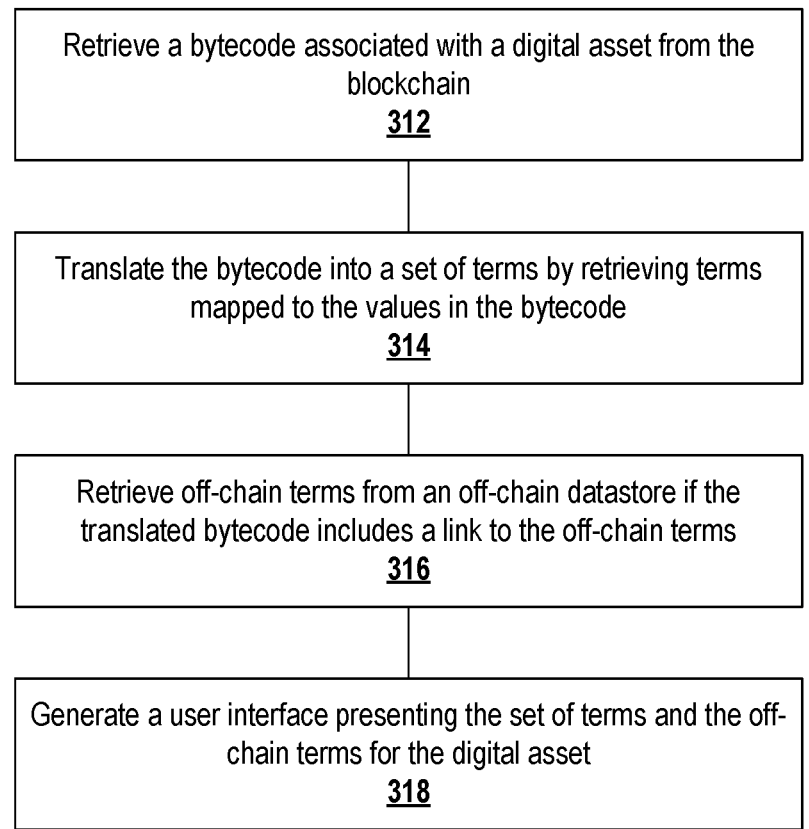

Retrieve a bytecode associated with a digital asset from the blockchain
312

Translate the bytecode into a set of terms by retrieving terms mapped to the values in the bytecode
314

Retrieve off-chain terms from an off-chain datastore if the translated bytecode includes a link to the off-chain terms
316

Generate a user interface presenting the set of terms and the off-chain terms for the digital asset
318

Digital Asset Exchange  332

| TITLE | NFT PROJECT |
|---|---|
| Description | |

Digital Asset #1  334

Verify Digital Asset
336

Purchase Digital Asset
338

Digital Asset Verification   350

Verified Terms   352

| TITLE | NFT PROJECT |
|---|---|
| Description | |
| Primary Digital Asset: | <Link> |
| Current Owner: | <Link> |
| Agreement Type: | Smart Contract-ERC 721 |
| Status: | Active – Not for sale |
| Storage Type: | Server – Backed Up |
| Other Terms: | Term 1, Term 2, ... Term X |
| Assigned: | Yes |
| Authorized for Commercial Use: | No |
| Authorized for Non-Commercial Use: | Yes |
| Authorized for use outside of the U.S.: | Yes |
| Royalty: | For each sale 10% to the original company and 5% to artist |
| Chain of Ownership | A, B, C, D, B |

Digital Asset Preview:

Comments:

User 1: ------------------------------------------------------------

FIG. 11

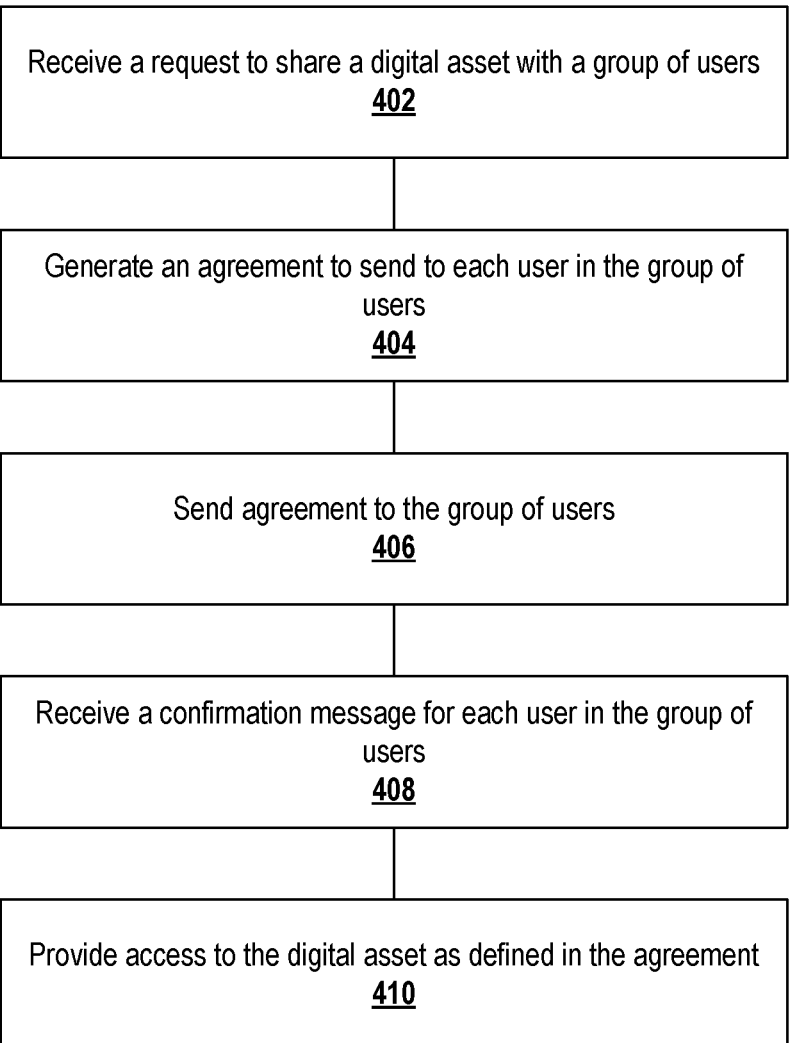

400

```
┌─────────────────────────────────────────────────┐
│  Receive a request to share a digital asset with │
│               a group of users                    │
│                      402                          │
└─────────────────────────────────────────────────┘
                        │
┌─────────────────────────────────────────────────┐
│  Generate an agreement to send to each user in    │
│              the group of users                   │
│                      404                          │
└─────────────────────────────────────────────────┘
                        │
┌─────────────────────────────────────────────────┐
│        Send agreement to the group of users       │
│                      406                          │
└─────────────────────────────────────────────────┘
                        │
┌─────────────────────────────────────────────────┐
│  Receive a confirmation message for each user in  │
│              the group of users                   │
│                      408                          │
└─────────────────────────────────────────────────┘
                        │
┌─────────────────────────────────────────────────┐
│  Provide access to the digital asset as defined   │
│              in the agreement                     │
│                      410                          │
└─────────────────────────────────────────────────┘
```

FIG. 13

DIGITAL ASSET AGREEMENT GENERATION AND VERIFICATION SYSTEM

CROSS-REFERENCE TO RELATED APPLICATIONS

This application claims priority to U.S. Patent Application No. 63/341,350, filed May 12, 2022, entitled DIGITAL ASSET AGREEMENT GENERATION AND VERIFICATION SYSTEM, the disclosure of which is hereby incorporated by reference in its entirety.

BACKGROUND

Blockchain technology is used as a digital ledger to record and track transactions. Many of these transactions are related to the minting and transferring of digital assets. In some instances, the digital asset is associated with a smart contract which includes self-executing code defining the terms of an agreement between the parties involved with the digital asset. Typically, a programmer writes the code using a programming language such as solidity. This code is then complied into executable code.

Digital assets are typically transferred on exchanges. Existing exchanges present user interfaces which allow the user to view aspects of the digital asset and associated smart contract. However, the specific terms and scope of the smart contract and/or digital asset are unclear to perspective buyers, especially if the buyer doesn't have the technical skills to translate the smart contract code. The exchanges can also be used to create or mint a digital asset. Some exchanges include options for adding the code for a smart contract or may include options to attach a default smart contract or allow the user to make selections from a limited and predefined set of terms. Accordingly, it is difficult for a user without the technical skills to code the smart contract to generate a smart contract with the terms desired by the user.

SUMMARY

In general terms, this disclosure is directed to methods and systems for generating and verifying digital asset agreements.

One aspect is a method for publishing a digital asset with an agreement, the method comprising receiving a digital asset, receiving inputs selecting terms for the agreement of the digital asset, the terms being in a natural language, translating the selected terms for the digital asset into a transaction protocol written in a transaction protocol language, compiling the transaction protocol into bytecode which can be published on a blockchain, publishing the bytecode on the blockchain.

Another aspect is a method for verifying an agreement associated with a digital asset, the method comprising receiving a digital asset ID associated with the digital asset, retrieving bytecode associated with the digital asset from the blockchain using the digital asset ID, translating the bytecode into terms, the terms being mapped to the values in the bytecode and being in a natural language, and presenting the terms on a user interface.

Another aspect is a method for sharing a digital asset among a plurality of owners, the method comprising receiving a request to share a digital asset with the plurality of owners, generating and sending an agreement for the digital asset to each of the plurality of owners, receiving a confirmation message for the agreement from each of the plurality of owners, and once the transfer of the digital asset to the plurality of owners is complete, automatically providing access to the digital asset as defined in the agreement.

Yet another aspect is a method for filtering a plurality of digital assets based on terms in an agreement attached to the digital asset the method comprising retrieving terms in agreements attached to a plurality of digital assets, receiving at least one input selecting at least one filter for the plurality of digital assets, filtering the digital assets based on the selected at least one filter and the retrieved terms, and presenting the plurality of digital assets with an indication of which of the plurality of digital assets met the at least one filter.

BRIEF DESCRIPTION OF THE DRAWINGS

FIG. 4 illustrates an example method for publishing a digital asset with a transaction protocol.

FIG. 6 illustrates an example user interface for publishing a digital asset.

FIG. 8 illustrates an example user interface for a digital asset agreement generator.

FIG. 9 illustrates an example method for verifying a digital asset.

FIG. 11 illustrates an example user interface for digital asset verification.

FIG. 13 illustrates an example method for generating an agreement to share a digital asset.

DETAILED DESCRIPTION

Figure 1:
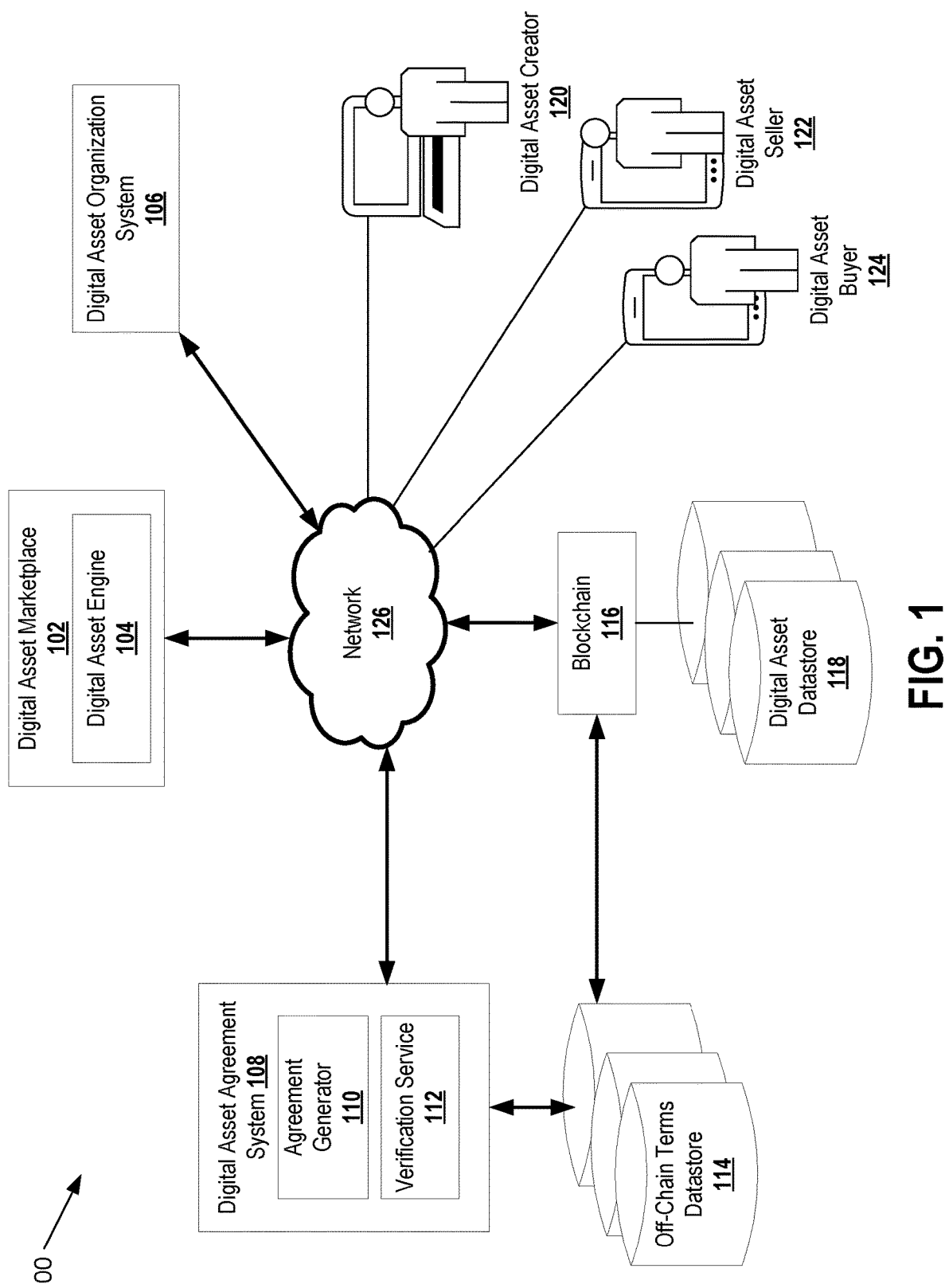
FIG. 1 illustrates an example environment for a digital asset agreement system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to methods and systems for generating and verifying digital asset agreements. Specifically, technology for improving and expanding digital asset agreements and technology for verifying the digital assets. In some embodiments, a translation engine is used to convert terms in natural language to a bytecode on a blockchain and vice versa. Some embodiments include technology which allows a user to select and create an agreement for a digital asset. Some embodiments include technology to convert bytecode on the blockchain for a digital asset into natural language so a user can understand the terms associated with a digital asset. For example, by presenting the terms in natural language (e.g., plain English) a potential buyer of an NFT will understand whether they are buying any rights in the underlying work. A seller of a digital asset may also wish to include terms which cannot be translated into bytecode and stored on the blockchain A transaction protocol operates a self-executing contract with blockchain technology (or another digital ledger technology). A smart contract is an example of a transaction protocol. The transaction protocol is compiled into a bytecode which is stored on a blockchain. In some embodiments, the transaction protocol is developed in code using a specialized programming language like Solidity.

In accordance with this disclosure a digital asset can include anything which uses a digital token which is used as proof of a legal right. The digital token can include a keys, certificate, fungible tokens, non-fungible tokens (NFTs), other blockchain assets, real assets with attached digital certificates, etc. Example legal rights can include ownership rights, right to use, contractual rights, intellectual property (IP) rights, and other property rights. Typically, the token is stored on a blockchain. The tokens can be stored on public or private blockchains. Typically, the blockchain is a distributed public blockchain network like Ethereum or Solana. In some embodiments, the digital asset is a digital file like such as a digital image file, digital video file, digital audio file, website, files storing word processing data (XML, Text File, Presentation file, spreadsheet file), etc. In some embodiments, the digital asset is associated with a real asset. For example, the digital asset may be associated with computer hardware and defines specific rights to use the computer hardware. In some embodiments, a real asset can be converted to a digital asset. For example, a user may be able to convert a physical drivers license to a digital asset. Other examples include title for vehicle, title for property, chain of ownership for property, criminal record, etc.

Figure 2:
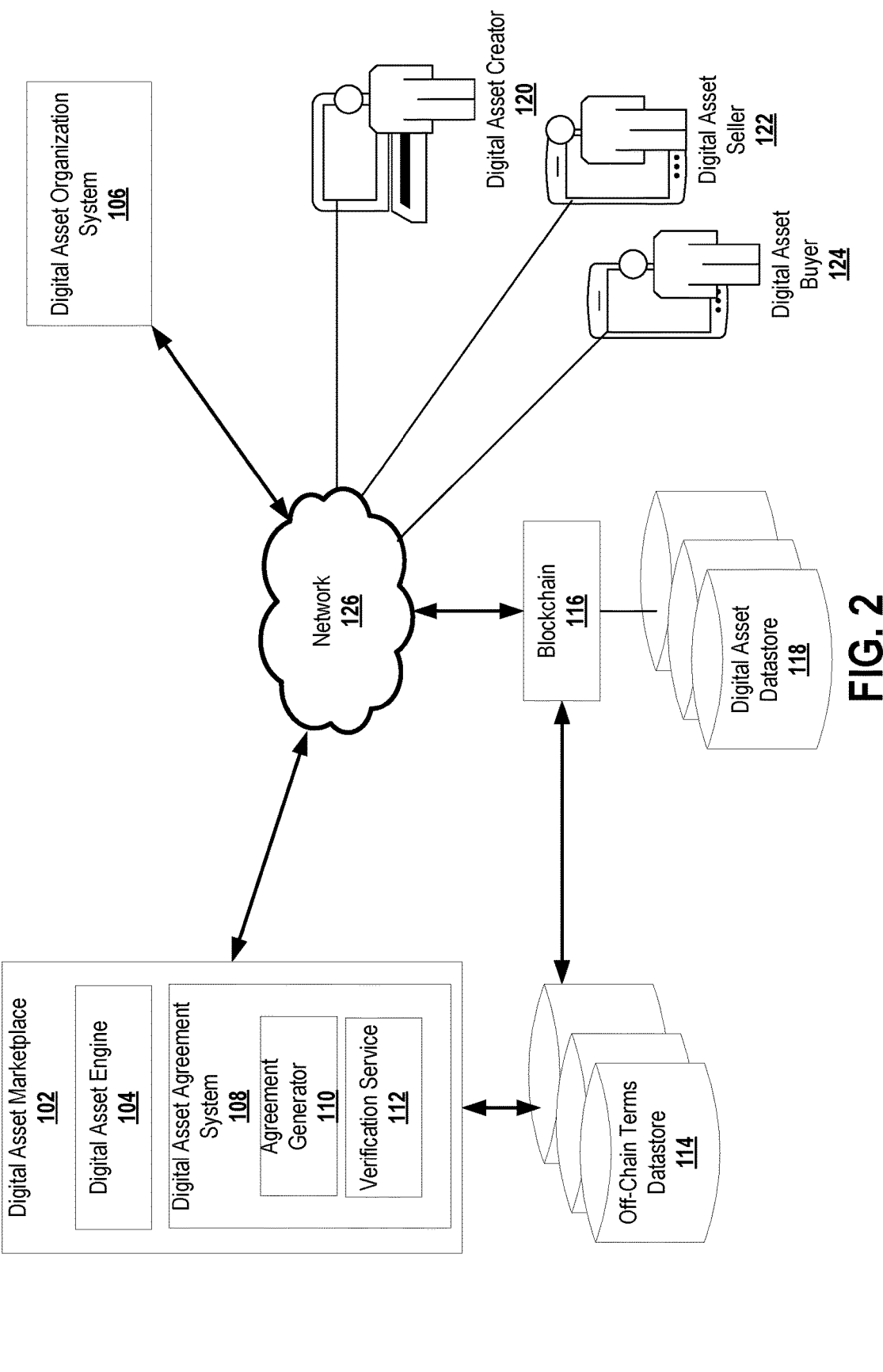
FIG. 2 illustrates an example environment for a digital asset agreement system.

FIGS. 1 and 2 illustrates an example environment 100 for a digital asset agreement system 108. The environment 100 includes a digital asset marketplace 102 with a digital asset engine 104, a digital asset organization system 106, a digital asset agreement system 108 with an agreement generator 110 and verification service 112, an off-chain terms datastore, a blockchain 116, a digital asset datastore 118, a digital asset creator 120, a digital asset seller 122, a digital asset buyer 124, and a network 126.

In some embodiments, the digital asset marketplace 102 includes one or more software modules programmed with computer readable electronic instructions to perform one or more operations associated with a digital asset exchange. The digital asset marketplace 102 operates a system for minting, previewing, and transferring digital assets. In some embodiments, the digital asset marketplace is accessible by users via the network 126. In some embodiments, the digital asset marketplace 102 provides a web application to interact with the digital asset marketplace. The digital asset marketplace 102 can be a centralized marketplace or a decentralized marketplace. Examples of digital asset marketplaces include NFT marketplaces such as OpenSea, Rarible, Bitsky, Sandmilk, NBA Top Shot Marketplace, etc.

In some embodiments, the digital asset marketplace 102 includes a digital asset engine 104. The digital asset engine 104 includes one or more software modules for managing the minting, buying, and selling of digital assets. In some embodiments, the digital asset engine 104 records transactions on the blockchain 116. In some embodiments, the digital asset engine 104 processes information on a digital ledger to provide a platform for buying and selling digital assets. Additionally, the digital asset engine may link various digital wallets to facilitate digital asset transactions.

The digital asset organization system 106 is operated by a digital asset organization to provide information to different stakeholders or prospective stakeholders in a digital asset. In some embodiments, the digital asset organization system 106 hosts a website which includes information for one or more digital asset projects. For example, the website can provide background information on a project, a white paper for the project, and terms of use for the project. In some examples, the digital asset organization system 106 may be hosted on a social network or communication platform. For example, the digital asset organization system 106 may include a discord server. In some embodiments, the digital asset organization system 106 includes resources limited to members of the organization, where the membership to the organization is based on rights in a digital asset.

In some embodiments, the digital asset agreement system 108 includes one or more software modules programmed with computer readable electronic instructions to perform one or more operations for generating and verifying digital asset agreements. For example, the digital asset agreement system 108 operates to perform the agreement generator 110 and the verification service 112. An example of the digital asset agreement system 108 is illustrated and described in reference to FIG. 3.

The agreement generator 110 operates to allow users to generate an agreement for a digital asset. The agreement generator 110 includes one or more software modules which allows a user to provide terms for a digital asset and translates the terms into bytecode which is stored on the blockchain. In some embodiments, the provided terms are translated into code for a smart contract.

The verification service 112 operates to allow users to verify an agreement for a digital asset. In some embodiments, a user interested in executing a digital asset transfer uses the verification service 112 to confirm the rights the seller is requesting to transfer in a sale of the digital asset.

The off-chain terms data store 114 stores terms for a digital asset that are not stored on the blockchain. Because of the complexity or specificity, it may be preferable for some terms to be stored in an off-chain terms data store 114. The off-chain terms data store may be a database operated by an organization. For example, the same organization as that operates the digital asset organization system 106. In other embodiments, the off-chain terms datastore may be a decentralized data store. In some embodiments, the off-chain terms data store 114 may be the same or similar to the digital asset datastore 118.

In some embodiments, the blockchain 116 includes a system with a plurality of computers linked over the network 126 which records a digital ledger. In some embodiments, the plurality of computers are linked in a peer-to-peer network. Alternative digital ledger systems can also be used. In some embodiments, the blockchain 116 is implemented with a platform technology. For example Ethereum is a decentralized platform for a blockchain. Another example includes Solana. Any platform for a blockchain can be used which allows for the operation of a transaction protocol.

The digital asset datastore 118 stores one or more digital assets. In some embodiments, the digital assets are digital files with an associated blockchain entry. The digital asset datastore 118 can be a centralized or decentralized datastore system. In some embodiments, the digital asset datastore 118 includes a backup policy which to provide additional security and resilience to the digital files associated with the digital asset.

The digital asset creator 120 is a user interested in minting a digital asset. In some embodiments, the digital asset creator 120 may be an artist or developer which designs the digital assets. In some embodiments, the digital asset creator 120 includes an organization interested in commissioning a digital asset. For example, the organization can be a company which hires a digital artist to create a digital asset for the organization. The digital asset seller 122 is a user interested in selling a digital asset. In some embodiments, the digital asset creator 120 is an initial digital asset seller 122. Digital asset buyer 124 is a user interested in buying a digital asset. Many other users can utilize the methods and systems disclosed herein.

Referring to FIG. 1 the digital asset agreement system 108 operates as separately from the digital asset marketplace 102. In some of these embodiments, the digital asset system provides a web-application which interfaces with a plurality of digital asset marketplaces. In some embodiments, the web application is provided as a plug-in (e.g., a browser plugin). In some embodiments, associated digital asset marketplaces can embed a plugin which links to the digital asset agreement system 108.

Referring to FIG. 2 the digital asset agreement system 108 is incorporated into the digital asset marketplace 102. For example, the digital asset agreement system 108 can directly implemented with the digital asset marketplace 102 to provide the features described herein.

Figure 3:
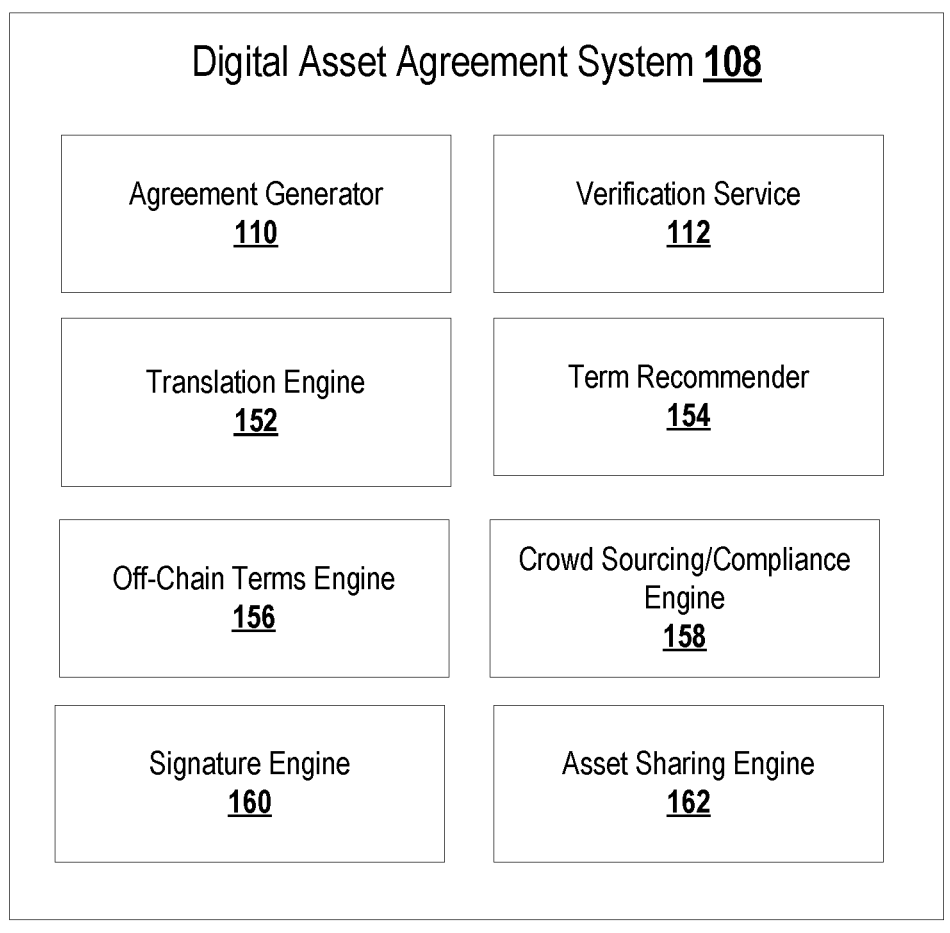
FIG. 3 illustrates an example digital asset agreement system.

FIG. 3 illustrates an example digital asset agreement system 108. The digital asset agreement system 108 can include any one or combination of an agreement generator 110, a verification service 112, a translation engine 152, a term recommender 154, an off-chain terms engine 156, a crowd sourcing/compliance engine 158, a signature engine 160, and an asset sharing engine 162.

The agreement generator 110 operates to generate an agreement for a digital asset. In some embodiments, the agreement generator receives inputs selecting and entering terms. These terms are sent to the translation engine 152 to translates the terms from natural language into code for a transaction protocol. In some embodiments, a user can copy this code to a digital asset marketplace to attach the agreement to a digital asset (for example, a digital asset to be minted). In some embodiments, the agreement generator 110 generates a user interface to receive inputs entering an agreement. Accordingly, the agreement generator 110 assists a user in generating agreements, including complex agreements, for digital asset. In many embodiments, the user is not required to understand how to code a transaction protocol or understand code written for a smart contract. Example user interfaces are illustrated and described in reference to FIGS. 7 and 8.

In some embodiments the agreement generator 110 allows a user to create a customized agreement. For example, an NFT creator can define a term that the rights in the underlying work remain with the creator and/or that any buyer of the NFT is only assigned non-commercial rights in relation to the underlying digital file associated with the NFT.

The verification service 112 operates to verify an agreement attached to a digital asset. In some embodiments, the verification service 112 generates a user interface which presents the terms of an agreement attached to a digital asset to a user in a natural language (e.g., plain English). In some embodiments, a user selects a digital asset to verify and the verification service 112 receives agreement attached to the digital asset via the blockchain and provides the bytecode to the translation engine 152 to translate the bytecode into plain English terms. In some examples, the verification service 112 is used by a prospective buyer of a digital asset to verify what terms they are accepted by purchasing a digital asset.

In some embodiments, the suer is not required to understand the underlying code utilize for the transaction protocol of the digital asset because the verification service 112 translates this code into natural language. For example, a buyer of an NFT may be confused on whether they are buying any rights in the underlying artwork and can use the verification service 112 to understand in plain English what rights they are acquiring if they purchase the NFT. For example rights related to ownership, assignability, etc. An example user interfaces for the verification service 112 are illustrated and described in reference to FIG. 11.

In some embodiments, due diligence completed on a digital asset is saved and stored on the blockchain. The verification service 112 can translate the due diligence into natural language so a future buyer can verify the digital asset without needing to perform due diligence which was previously done.

The translation engine 152 executes the logic to translate terms in natural language to code for a transaction protocol. In some embodiments, the translation engine 152 further translates bytecode form the blockchain into terms in a natural language. The translation engine operates with the agreement generator 110 and/or the verification service 112 to perform the operations described herein. In some embodiments, the translation engine 152 complies the transaction protocol into bytecode which can be stored on the blockchain. In some embodiments, the translation engine 152 decompiles bytecode to the transaction protocol and then translated the transaction protocol to natural language. In some embodiments, the translation engine 152 directly maps values in the bytecode into natural language terms.

The term recommender 154 predicts terms which a user might be interested in adding to an agreement. In some embodiments, the term recommender 154 uses artificial technology to determine which terms to recommend to a user. In some embodiments, as a user starts to type a term one or more recommendations are presented to the user.

The off-chain terms engine 156 executes the logic for managing an off-chain terms data store. In some embodiments, the off-chain terms engine 156 sends off-chain terms to an off-chain datastore and generates a link to the off-chain terms which can be inserted in the transaction protocol.

The crowd sourcing/compliance engine 158 provides a service to allow users to record and put on record events, determinations, or warnings associated with the digital asset. For example, the crowd sourcing/compliance engine 158 can receive messages from users that a digital asset includes content which is likely a legal trespass of a person or organizations rights. For example, the warning could include that a digital asset includes a mark which is likely trademark infringement. Similarly, if a court or other organization with legal authority determines that a digital asset includes trademark infringement a user can report the determination using the crowd sourcing/compliance engine 158. In some embodiments, all users can report using the crowd sourcing/compliance engine 158. In other embodiments, only users given specific access to the crowd sourcing/compliance engine 158 can report. In some embodiments, the verification service will automatically present the reports provided to crowd sourcing/compliance engine 158 when a user verifies a digital asset agreement.

The signature engine 160 is used to connect the agreement to the digital asset such that any buyer is determined to have singed the agreement. In some embodiments, the signature engine 160 processes the agreement to determine what requirements must be met for a signature. In some embodiments, the signature engine may send tickets to users which must be complete in order to transfer the digital asset. For example, the ticket may require a user to print, sign, and scan a document which is uploaded to the digital asset agreement system 108. In some embodiments, a digital signature system (e.g. DocuSign®) is used).

The asset sharing engine 162 operates to generate and automatically execute an agreement to share a digital asset between a plurality of owners. An example method for generating an agreement to share a digital asset is illustrated and described in reference to FIG. 13.

FIG. 4 illustrates an example method 180 for publishing a digital asset with a transaction protocol. The method 180 includes the operations 182, 184, 186, 188, 190, and 192.

The operation 182 receives a digital asset or an identifier for a digital asset. In some embodiments, receiving a digital asset includes receiving a link to where a digital asset is stored or where it will be stored. In typical embodiments, this link is compiled into the bytecode associated with the digital asset. In some embodiments, an agreement can be created for a plurality of digital assets. In these embodiments, a plurality of digital assets are received at the operation 182 (or a plurality of identifiers).

The operation 184 selects a transaction protocol type. In some embodiments, a user can select from a plurality of transaction protocol types depending on the type of digital asset and type of agreement the user would like to attach to the digital asset. In some embodiments, the transaction protocol type includes a programming language for programing the transaction protocol. Examples of programing languages used to generate a transaction protocol type selector 264 include Solidity, Rust, JavaScript, and Viper. In some embodiments, a transaction protocol is a smart contract.

The operation 186 selects terms for the transaction protocol. Terms can include defining what token standard should be used to represent ownership of the digital asset. In some embodiments, ownership of a digital asset is represented by a standard token. For example, ownership of digital assets on the Ethereum blockchain may be represented by a standard token such as ERC 721 or ERC 1155. Further terms may define different rights which are included or explicitly not include in the transfer of the digital asset. For example, a user can explicitly define that no rights in the underlying work are transferred to a buyer except the right for non-commercial use. Other terms can include royalties paid to the creator or artist for each transaction or terms which trigger the automatic transfer of the digital asset. Any term which can typically be included in a contract may bed added to the agreement. Example terms include token standard, blockchain, and creator fees.

The operation 188 translate the terms into a transaction protocol of the selected transaction protocol type. In some embodiments, the terms are mapped to code for the transaction protocol for implementing the agreement. In some embodiments, artificial technology (AI) is used to translate terms into the transaction protocol. In some embodiments, the translated transaction protocol can be copied and pasted into an entry for a digital asset on a digital asset marketplace web application. In these embodiments, the operation 190 and 192 are performed using the digital asset marketplace system. In other embodiments, the transaction protocol is automatically complied into bytecode at the operation 190.

The operation 192 publishes the bytecode on a blockchain. In some embodiments, the bytecode is stored on the blockchain with a digital ledger tracking transactions related to the bytecode. In some embodiments, the bytecode is self-executing in response to certain events. In some embodiments, publishing the bytecode on the blockchain includes the creating of a contract address and/or a token ID.

Figure 5:
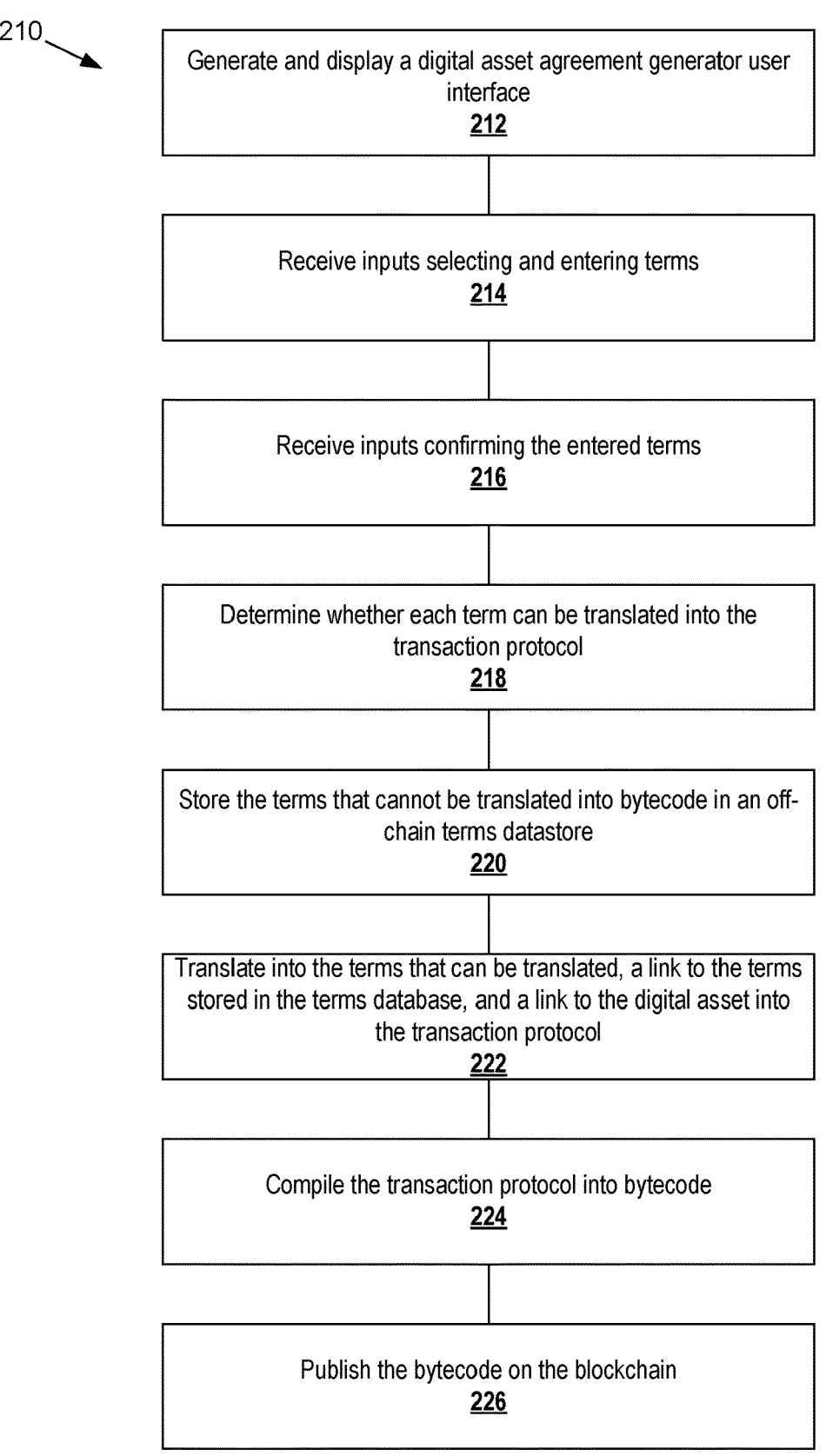
FIG. 5 illustrates an example method for generating and publishing an agreement for a digital asset.

FIG. 5 illustrates an example method 210 for generating and publishing an agreement for a digital asset. The method 210 includes the operations 212, 214, 216, 218, 220, 222, 224, and 226.

The operation 212 generates and displays a digital asset agreement generator user interface. Example user interfaces are illustrated and described in reference to FIGS. 7 and 8.

The operation 214 receives inputs selecting and entering terms. In some embodiments, the inputs are received using UI elements such as radio selections, selection boxes, drop-down menus and/or text entry boxes. In some embodiments, AI technology is used to recommend terms for selection.

The operation 216 receive inputs confirming the entered terms. In some embodiments, the input confirming the entering the terms includes a process or the seller to sign the agreement. In other embodiments, a user selecting a button to publish and/or mint the digital asset will also be used for confirming the agreement. In some embodiments, a preview is presented to a user prior to confirming the agreement.

The operation 218 determine whether each term can be translated into the transaction protocol. For example, some terms may be too complex or specialized to easily be coded in the transaction protocol. These terms may be identified for being stored as off-chain terms in the off-chain datastore at the operation 220.

The operation 222 translate into the terms that can be translated, a link to the terms stored in the terms database, and a link to the digital asset into the transaction protocol. In some embodiments, the operation 222 operates similar or the same as the operation 188 illustrated and described in reference to FIG. 4.

The operation 224 compiles the transaction protocol into bytecode and the operation 226 publishes the bytecode on the blockchain.

FIG. 6 illustrates an example user interface 240 for publishing a digital asset. In some embodiments, the user interface 240 is presented to a digital asset creator who is about to publish a digital asset. In some embodiments, the user interface 240 is presented to a digital asset creator before minting the digital asset. In other embodiments, a digital asset creator can publish a digital asset which will mint at a later time.

The user interface 240 includes a publish input 242, a save for later input 244, and a generate agreement input 246. The publish input 242 is selected when user wishes to publish a digital asset on a digital asset marketplace. The save for later input 244 is selected when a user wishes to save their progress for the digital asset. For example, a user can store the link to the digital asset and initial selections for a transaction protocol. The generate agreement input 246 is selected by a creator who wishes to define additional terms for the transaction protocol. In some embodiments, when a user selects the generate agreement input 246 one of the user interface 260 illustrated in FIG. 7 or the user interface 280 illustrated and described in FIG. 8 is presented to a user. In some embodiments, the user redirected to a separate webpage which presents one of the user interfaces, in some embodiments the user interfaces and associated features are built into the digital asset marketplace web application. In other embodiments, the generate agreement user interfaces are part of a browser plugin.

Figure 7:
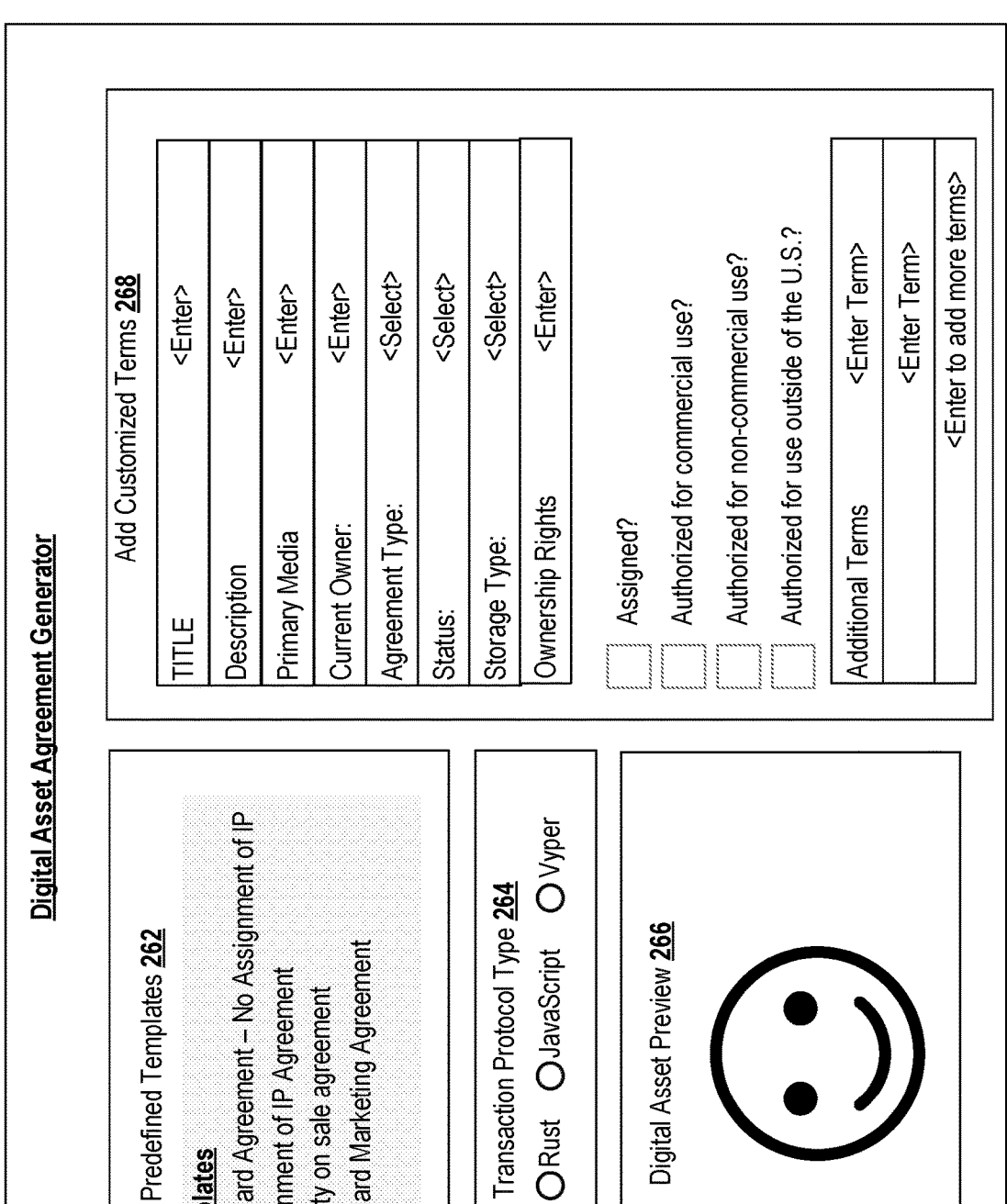
FIG. 7 illustrates an example user interface for a digital asset agreement generator.

FIG. 7 illustrates an example user interface 260 for a digital asset agreement generator. Many UI elements shown in the user interface 260 can be interchangeable depending on the types of terms or based on how common certain terms are used. Additionally, many other user interface elements can be used.

The user interface 260 includes a drop down menu for selected a predefined agreement template 262. Examples of predefined templates include standard agreement with no assignment of IP, assignment of all IP agreement, royalty on sale agreement, and a standard marketing agreement. In some embodiments, administrators can create and define any predefined template based on what agreements are popular. In some embodiments, machine learning technology can be used to learn from a plurality of agreements different templates of common agreements.

The user interface 260 also includes a transaction protocol type selector 264. In the example shown, the transaction protocol type selector is a radio selector among a list of transaction protocol types. Other UI elements (dropdown menus, text input) can also be used.

The user interface 260 includes a digital asset preview 266. The digital asset preview 266 can show a preview of the underlying digital file, certificate, or other representation of the digital asset. For example, the digital asset preview may present the digital content (image, text, music, video, GIF) of an NFT.

The user interface 260 also includes an add customized terms element 268. This can include dropdown menus, selection boxes, radio selectors, text input boxes. In some embodiments, AI technology can be used to assist a user with entering additional terms. For example, AI technology can be used to present suggested terms as a user starts to type addition terms in a text box.

FIG. 8 illustrates an example user interface 280 for a digital asset agreement generator. The user interface 280 is similar to the user interface 260 illustrated in FIG. 7, except the user interface 280 is presented to a user who wishes to wrap an additional agreement with an existing digital asset. In this example, some terms are already locked with the existing agreement for the digital asset. These terms are extracted by translating the bytecode for the digital asset form the blockchain. The extracted terms are presented at the extracted terms element 282.

The predefined agreement template 284 operates similarly or the same to the predefined agreement template 262 illustrated and described in reference to FIG. 7. The digital asset preview 288 operates similarly or the same to the digital asset preview 266 illustrated and described in reference to FIG. 7. The add customized terms element 286 operates the same or similar to the add customized terms element 268 illustrated and described in reference to FIG. 7.

FIG. 9 illustrates an example method 310 for verifying a digital asset. The method 310 includes the operation 312, 314, 316, and 318.

The operation 312 retrieves a bytecode associated with a digital asset from the blockchain. In some embodiments, a digital asset ID for the digital asset of interest for verification is received. This ID is utilized to retrieve the bytecode associated with the digital asset from the blockchain.

In many typical embodiments, the operation 312 receives a transaction protocol for a one or more digital assets. For example, a single transaction protocol (e.g., smart contract) may attach to a plurality of digital assets. In these examples, a user can provide the transaction protocol to verify the agreement for the plurality of digital assets at the same time. In some embodiments, the transaction protocol is entered for a single digital asset. In some embodiments, a user provides the transaction protocol by entering a transaction address to the verification service. For example, a user can request verification for a smart contract by providing the contract address to the verification service.

The operation 314 translates the bytecode into a set of terms by retrieving terms mapped to the values in the bytecode. In alternative embodiments, the bytecode is decompiled into the transaction protocol and the natural language terms are mapped to the code in the transaction protocol.

The operation 316 retrieves off-chain terms from an off chain datastore if the translated bytecode includes a link to the off-chain terms. In some embodiments, the operation 316 is skipped if there is not link to off-chain terms. In some embodiments, crowdsourced information, user comments, compliance comments are also retrieved as part of the operation 316.

The operation 318 generates a user interface presenting the set of terms and the off chain terms for the digital asset. An example user interface for presenting the set of terms and the off-chain terms (if any) for the digital asset is illustrated and described in reference to FIG. 11. The terms are presented in a natural language so that a user can understand the agreement even if the user is unfamiliar with programing or the specific transaction protocol used.

Figure 10:
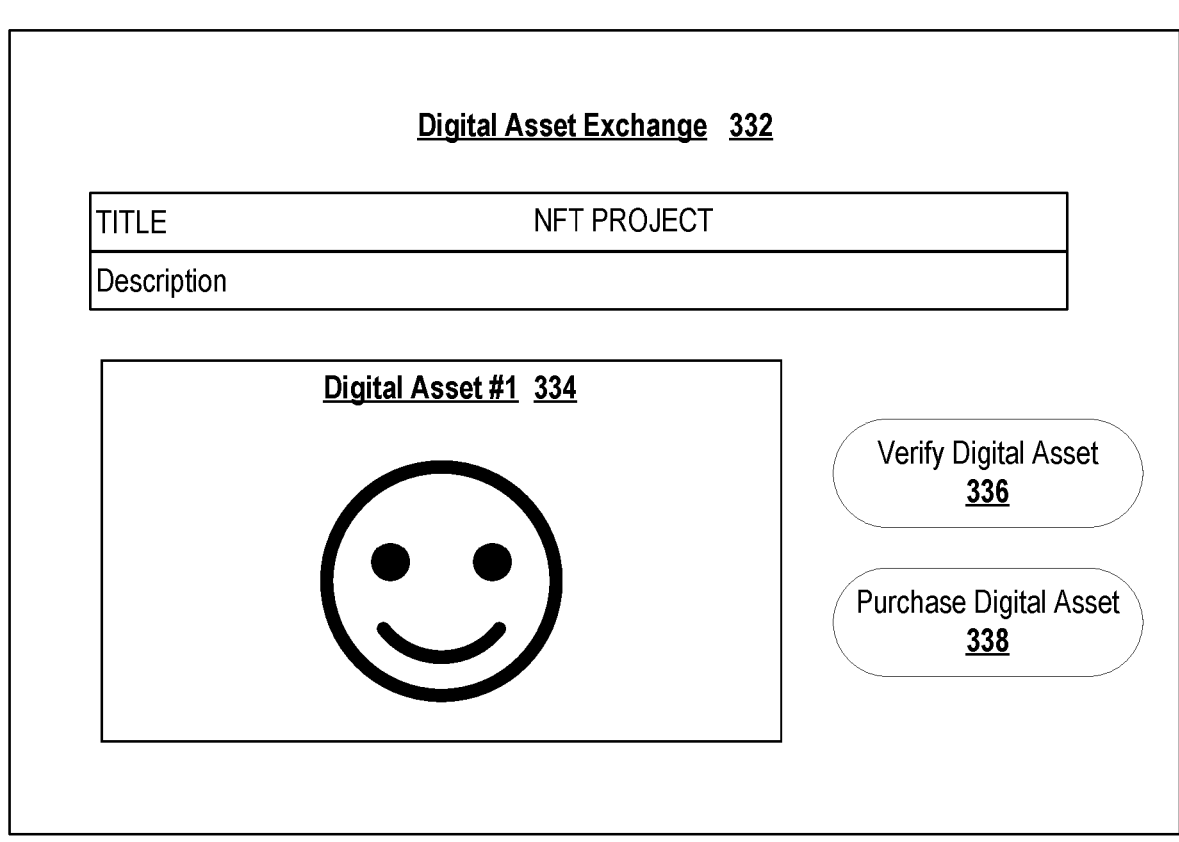
FIG. 10 illustrates an example user interface for a digital asset exchange with a verify digital asset feature.

FIG. 10 illustrates an example user interface for a digital asset exchange with a verify digital asset feature. The user interface 330 includes a digital asset exchange interface 332 which includes a title for the digital asset, a description of the digital asset, and a digital asset preview 334.

The user interface 330 also includes a verify digital asset input 336 which is selected to present a user interface of the digital asset verification (e.g., the user interface shown in FIG. 11). In some embodiments, a user is directed to a digital asset agreement web application when selecting the verify digital asset input 336. In other embodiments, the verification service is built into the digital asset exchange web application. In alternative embodiments, verification service is built into a browser plug-in (e.g., chrome plug-in).

Also shown is a purchase digital asset input 338 which when selected initiates a process to purchase or bid on the digital asset.

FIG. 11 illustrates an example user interface 350 for digital asset verification. The user interface 350 presents the terms for the agreement attached to the digital asset. In some embodiments, the terms may be significantly long (e.g., a collection of term paragraphs defining words and parties for the agreement including several pages of text). In these embodiments, a link may be presented to the entire agreement while the user interface 350 shows only a preview of select terms. In some embodiments, AI technology or machine learning technology is used to highlight terms which may be of particular interest to a user. Additionally, user comments, crowdsourced reports, and or compliance warning can also be presented on the user interface 350.

Figure 12:
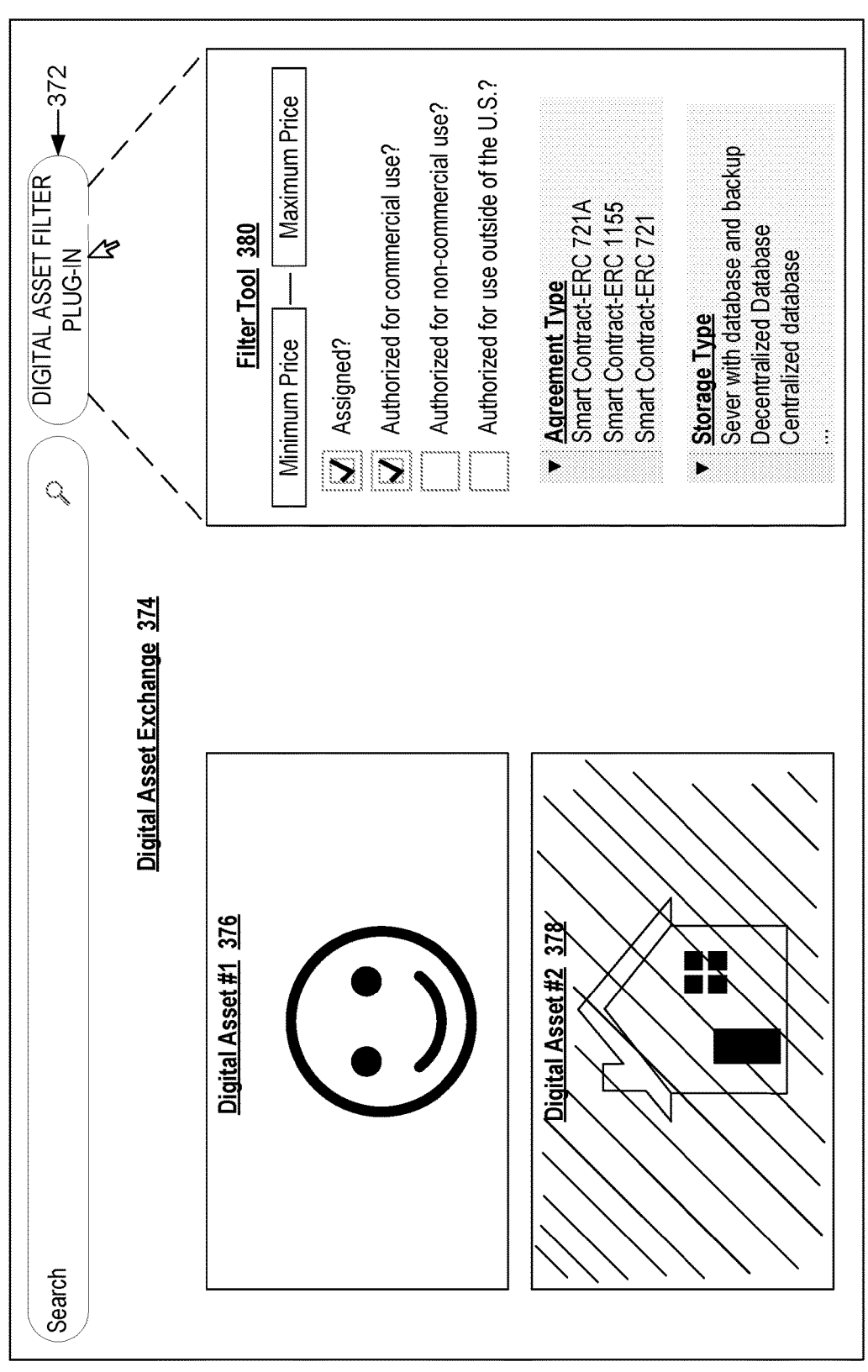
FIG. 12 illustrates an example user interface for filtering digital assets.

FIG. 12 illustrates an example user interface 370 for filtering digital assets. The user interface 370 includes a digital asset exchange interface 374 presenting a first digital asset 376 and a second digital asset 378.

In the example shown, the digital asset filter plugin 372 is a browser plug-in but the features described in reference to FIG. 12 can be integrated into digital asset exchange web application or as part of separate filtering application.

The digital asset filter plug-in presents a filter tool user interface 380. The filter tool user interface 380 presents different selections to filter digital assets on a digital asset exchange. For example, a user can filter digital assets based on terms of an agreement attached to the digital asset. For example, a user can filter for digital assets which are authorized for commercial use. Any term or characteristic of the digital asset can be used to filter digital assets. Once the filters are selected the digital assets presented on the digital asset exchange interface 374 are presented with an indication of whether the digital asset meets the requirements of the filter. In the example shown, the indication includes lines blocking out the digital asset which did not meet the requirements of the filter. Other indications include watermarks, color indicators for the digital assets which did and/or did not meet the filter (e.g., red box around digital assets which did not meet the filter and/or a green box around a digital asset which did meet the filter) or removing digital which did not meet the filter from display. Other indicators of whether a digital asset meets a filter can also be used.

FIG. 13 illustrates an example method 400 for generating an agreement to share a digital asset. The method 400 includes the operations 402, 404, 406, 408, and 410.

The operation 402 receives a request to share a digital asset with a group of users. For example, a group of users may be interested in sharing ownership of a digital asset. For example, users can create an agreement to share a digital asset in order to facilitate the acquisition of capital to acquire the digital asset.

The operation 404 generates an agreement to send each user in the group of users. The agreement will indicate terms for sharing the digital asset including defining the division of rights and which rights are shared and other terms for defining the relationship to the digital asset among the group of users.

The operation 406 sends an agreement to the group of users. Each user is sent an agreement which the users can verify (e.g., using the verification service 112) before determining whether they wish to join the agreement. Once the user determines they would like to enter the agreement they select inputs to send a confirmation message.

The operation 408 receives the confirmation message for each user in the group of users. Once confirmation messages are received from each of the group of users the agreement is entered. In some embodiments, if the transaction proceeds the agreement is translated form natural language into a transaction protocol and eventually compiled into self-executing code stored on the blockchain.

The operation 410 provides access to the digital asset as defined in the agreement. For example, the agreement may define when a user is able to access the digital asset or who has access to transfer the digital asset. The operation allows users to access the digital asset in accordance with the agreement.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein.

Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, service, application, module, unit, logic, and so on) as taking an action or causing a result. Such expressions are merely a shorthand way of stating that the execution of the software by a processing system causes the processor to perform an action to produce a result.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for verifying an agreement associated with a digital asset, the method comprising:

storing one or more off-chain terms of natural language terms in an off-chain datastore;

generating a link to the off-chain datastore for retrieving the one or more off- chain terms of the natural language terms;

inserting the link into a smart contract generated using the natural language terms;

compiling the smart contract into bytecode;

publishing the bytecode on a blockchain in connection with a digital asset ID associated with the digital asset;

receiving the digital asset ID associated with the digital asset;

retrieving the bytecode associated with the digital asset from the blockchain using the digital asset ID;

decompiling the bytecode into the smart contract;

translating the smart contract into the natural language terms, the natural language terms being mapped to the smart contract;

retrieving the link from the smart contract;

retrieving, using the link, the one or more off-chain terms of the natural language terms from the off-chain datastore; and generating a user interface and presenting the one or more off-chain terms of the natural language terms retrieved from the off-chain datastore and the natural language terms.

2. The method of claim 1, the method further comprising:

generating the user interface to present the natural language terms.

3. The method of claim 2, wherein the user interface uses AI technology to highlight terms of particular interest.

4. The method of claim 2, wherein the user interface is integrated with a digital asset marketplace web application.

5. The method of claim 1, wherein the user interface is integrated in a digital asset agreement web application, separate from a digital asset marketplace web application.

6. The method of claim 1, wherein the user interface is integrated in a browser plug-in.

7. The method of claim 1, further comprising:

generating a crowdsourcing/compliance engine, configured to receive inputs from a plurality of users reporting an event associated with the digital asset.

8. The method of claim 7, wherein the event includes a determination that the digital asset includes a trespass of an interested party's rights.

9. The method of claim 8, wherein the trespass comprises copyright infringement, trademark infringement, patent infringement, contract breach, or any combination thereof.

10. The method of claim 1, wherein the user interface further includes an element for receiving and presenting comments from users.

11. The method of claim 1, further comprising sharing the digital asset by:

receiving a request to share a digital asset with a plurality of owners;

generating and sending an agreement for the digital asset to each of the plurality of owners;

receiving a confirmation message for the agreement from each of the plurality of owners; and once the transfer of the digital asset to the plurality of owners is complete, automatically providing access to the digital asset as defined in the agreement.

12. The method of claim 1, further comprising filtering a plurality of digital assets based on terms in an agreement attached to the digital asset, the method comprising:

retrieving terms in agreements attached to a plurality of digital assets, the plurality of digital assets including the digital asset;

receiving at least one input selecting at least one filter for the plurality of digital assets;

filtering the digital assets based on the selected at least one filter and the retrieved terms; and presenting the plurality of digital assets with an indication of which of the plurality of digital assets met the at least one filter.

13. The method of claim 12, wherein a user selects a transaction protocol type.

14. The method of claim 12, further comprising:

generating a user interface configured to present inputs for selecting terms for the digital asset.

15. The method of claim 14, wherein the inputs include at least one of: a radio input, a selection toggle, text input, and/or dropdown menu.

16. The method of claim 14, wherein at least one input includes a selection for a plurality of default agreements.

17. A digital asset agreement system comprising at least one processor and at least one memory device storing instructions which, when executed by the at least one processor, cause the digital asset agreement system to perform the method of claim 1.

18. A non-transitory computer readable storage medium storing instructions which, when executed, cause a computing system to perform the method of claim 1.

\* \* \* \* \*